United States Patent [19]

Talerico

[11] Patent Number: 5,209,779
[45] Date of Patent: May 11, 1993

[54] ICING SPREADER

[76] Inventor: Robert Talerico, 7485 Oak Grove, Justice, Ill. 60458

[21] Appl. No.: 713,509

[22] Filed: Jun. 12, 1991

[51] Int. Cl.$^5$ ............................................. B05C 5/00
[52] U.S. Cl. ................................... 118/24; 118/13; 118/300; 118/313; 426/307; D7/683; 99/494
[58] Field of Search ............ 118/14, 13, 24, 300, 118/25, 313; 222/565; 426/307, 512; D7/672, 673, 683, 693; D28/21, 30, 31, 32, ; 366/129, 343; 99/494; 294/55.5, 50.8; 15/146, 159 R, 166, 236.08

[56] References Cited

U.S. PATENT DOCUMENTS

| | | | |
|---|---|---|---|
| D. 230,392 | 2/1974 | Rousseau | D7/683 X |
| D. 244,712 | 6/1977 | Houston | D28/21 X |
| D. 278,863 | 5/1985 | Bradley | D28/31 X |
| D. 282,876 | 3/1986 | Harvey | D28/31 |
| 885,580 | 4/1908 | Breckenridge | 294/55.5 |
| 1,004,438 | 9/1911 | King | 15/166 |
| 1,233,337 | 4/1917 | Funk | 294/55.5 |
| 2,084,603 | 6/1937 | True | 15/236.08 X |
| 2,320,529 | 6/1943 | MacManus . | |
| 2,729,434 | 1/1956 | Walden | 366/343 |
| 3,148,686 | 9/1964 | Cournoyer | D28/21 X |
| 3,214,777 | 11/1965 | Kutik | 15/158 R |
| 3,292,641 | 12/1966 | Quintanar | D28/21 X |
| 3,427,650 | 2/1969 | Woody . | |
| 4,745,968 | 5/1988 | Demos | D7/683 X |

Primary Examiner—W. Gary Jones
Assistant Examiner—Todd J. Burns
Attorney, Agent, or Firm—James N. Videbeck

[57] ABSTRACT

A bakery icing spreader includes an elongate spine or handle portion sized for ease of grasping by a baker. A plurality of tines depend in spaced relation and like direction from said handle and are sufficiently long and have sufficient surface area to retain icing thereon for a time after the tines are dipped in a bakery icing pan. The loaded spreader is then manually passed over pieces of bakery baked on batch-type trays and a stream of icing falls onto the bakery in any pattern manipulated by a user.

3 Claims, 1 Drawing Sheet

ICING SPREADER

BACKGROUND OF THE INVENTION

This invention relates generally to improvements in bakery utensils and equipment, and more particularly to improvements in means for spreading icing or other bakery decoration on bakery products made by a batch-type process.

Heretofore, the application of thin streams of icing to individual pastry pieces, streusel, coffee cakes, etc., has taken two differing approaches. For making individual pastry pieces, coffee cakes, etc., the traditional method of applying a thin stream or streams of icing has been for a baker dip his hand in a pan of icing, and thereafter run the hand, fingertips down, above the individual piece or pieces of bakery laid out in a baker's pan. The icing would then drip from the fingers of the baker's hand onto the pastry with the baker's hand being moved in a desired pattern over the pastry, or moved to cover the pieces of pastry laid out in grid fashion in a typical 18×36 inch baker's pan, or the like. When using this technique, the baker must wash his or her hands after each such batch or icing application. Over time, the baker's hands become dry and irritated. Also, the time needed to clean the baker's hands is subtracted from the time for which the baker can constructively prepare additional bakery.

The second type of application of icing to bakery products has been by use of complex application machines, typically tied into large conveyor belt-type baker production lines. Such machines are shown in U.S. Pat. Nos. 2,320,529 and 3,427,650.

A need has developed for an icing spreader utensil which aids a baker in spreading icing evenly and uniformly, in desired patterns, on individual or batch-made bakery. It is therefore an object of the present invention to provide an improved means for distributing bakery decoration in the form of icing across bakery made in batch-type processes.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, wherein like reference numerals identify like elements throughout, and in which:

DETAILED DESCRIPTION OF THE PREFERRED EMBODIMENT

Figure 1:
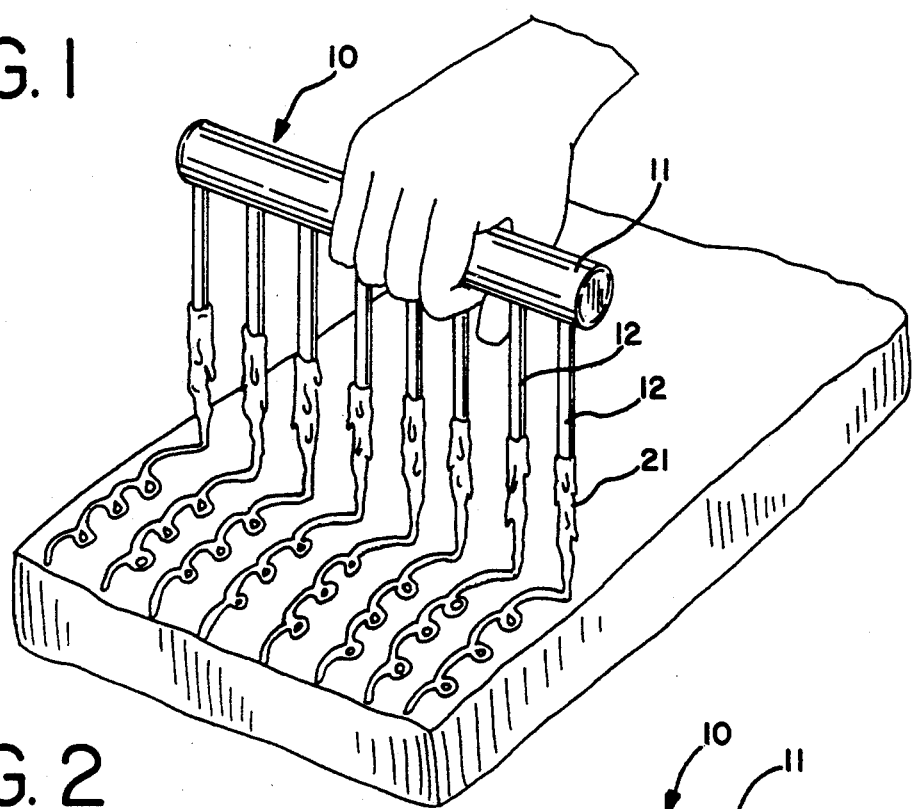
FIG. 1 is a perspective view of the batch-type icing spreader constructed in accordance with the present invention shown in use.
Figure 2:
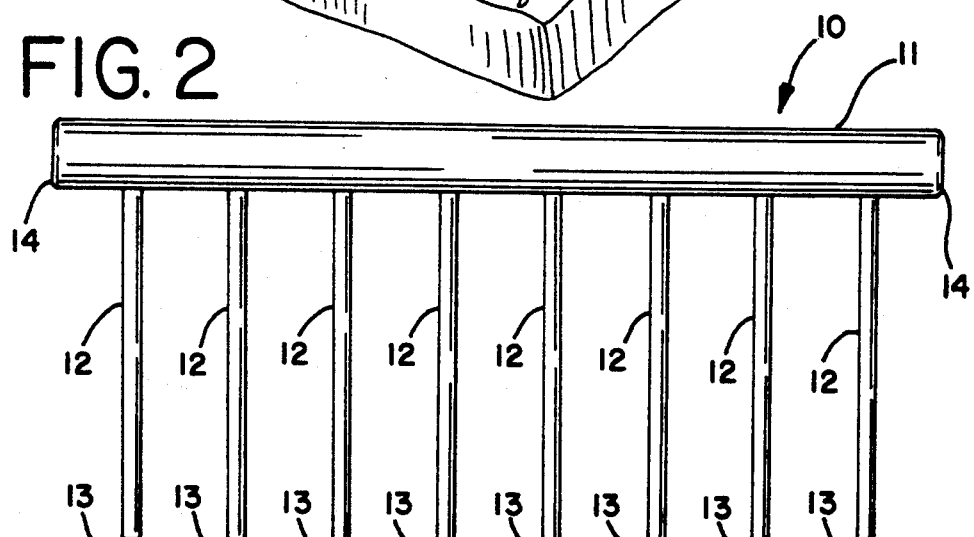
FIG. 2 is a front elevational view of the icing spreader shown in FIG. 1.
Figure 3:
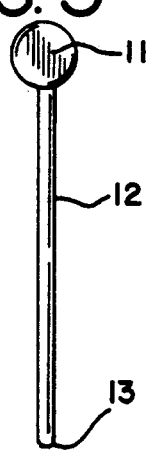
FIG. 3 is an end elevational view of the icing spreader shown in FIG. 2.

Referring to FIGS. 1-3, a batch-type icing spreader, generally indicated at 10, constructed in accordance with the present invention, includes a transverse spine or handle 11 made of 1¼ inch diameter bar stock and being 16 inches long in the preferred embodiment. Depending from handle 11 are a plurality (in this embodiment) of individual tines positioned in spaced relationship (2 inches center to center) along the handle in like downwardly facing direction. In the preferred embodiment, the tines are ⅜ inch rod and are approximately 8 inches long. Each of the tines 12—12 are press fit into holes (not shown) bored in the bottom of handle 11. In this embodiment, each of the tines 12 is rounded at its distal end 13, and each end 14—14 of the handle 11 is chamfered or rounded to avoid sharp edges on the icing spreader 10.

Preferable materials for the icing spreader 10 include stainless steel, aluminum, and food safe plastics. While the item may be made of machined bar stock, the icing spreader may also be molded, die cast, or the like, from numerous food safe metals and plastics.

The dimensions previously given for the preferred embodiment may be modified to a certain extent as long as the handle, spine, etc., 11 may easily be grasped by a user. For example, a two inch diameter handle may be utilized. Also, the tines 12—12 may have differing lengths and diameters to a certain extent, as long as there is sufficient surface area to attract a substantial amount of icing onto the tines and retain that amount of icing a sufficient amount of time to provide for icing a group of pastry pieces in a typical batch-type pastry pan. The tines should be sufficiently long to support the handle at a position above the edge of an icing pan 20 (FIG. 4) when the distal ends 13—13 are resting on the bottom of the pan, a preferred length range would be from about 5 inches to about 10 inches. Experience has shown that very thin rods, such as 1/16 diameter inch, or the like, do not have sufficient surface area to retain the amount of icing thereon which is needed for use in the icing of batch-type bakery products. Diameters approaching those of user fingers, such as ⅜ inch, may be utilized to retain icing thereon as the utensil is moved from an icing pan to a position over the bakery.

Figure 4:
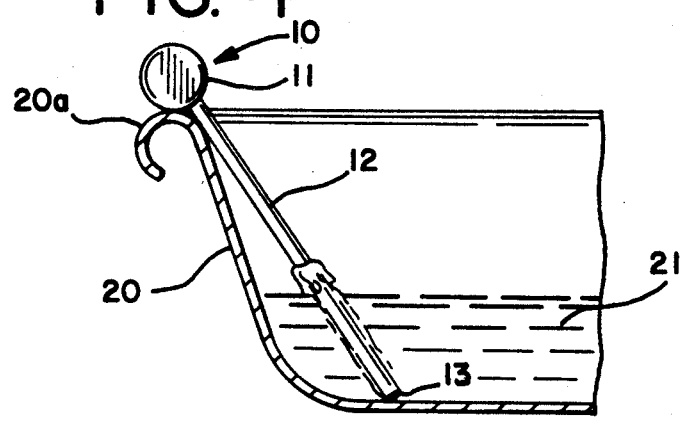
FIG. 4 is a fragmentary sectional view of a typical bakery icing pan showing the icing spreader of the present invention as positioned therein and ready for use.

In one other aspect of the present invention, as shown most clearly in FIG. 4, the handle portion 11 of the icing spreader is sufficiently larger in width than each of the tines 12—12 so that the spreader will rest upon the top flange 20a of a typical bakery mixing pan 20 so that the spreader will not slide into the pan and under the icing. One object of the icing spreader of the present invention is to enable the icing of bakery products in batch-type pans without the baker coming into digital or manual contact with the icing, thus saving time previously used for cleaning the baker's hands after every such icing procedure. As can clearly be seen in FIG. 1, the baker can grasp the handle 11 and remain away from the icing 21 retained upon the tines 12—12.

Operation

In operation, which is shown most clearly in FIGS. 1 and 4, the icing spreader of the present invention is grasped around the handle 11 by a user. The spreader 10 is then positioned so that its tines 12—12 may be dipped into a pan 20 having icing 21 prepared therein (FIG. 4). Each of the tines 12—12 is dipped into the icing 21, and when removed therefrom retains a layer of the icing 21 around the outer surface of the tines 12—12. The spreader is then positioned as shown in FIG. 1 over a piece of bakery, or a plurality of bakery pieces positioned in a batch-type bakery pan, and as gravity pulls the icing off of each of the tines 12—12, the user may hand manipulate the position of spreader 10 over the bakery piece or pieces to make whatever pattern of icing is desired on the bakery piece or pieces. When the icing completely runs off the tines, or a sufficient amount of icing runs off the tines, then additional icing is required. The icing spreader 10 is again returned to the icing pan 20 and tines 12—12 are dipped therein to reload the spreader.

Thus, an improved means of spreading icing over individual bakery pieces, or batch-type bakery pieces in a typical baking pan, has been shown and described. While one embodiment of the present invention has been disclosed, it will be obvious to those skilled in the art that changes and modifications may be made within the scope of the invention. It is the purpose of the appended claims to cover all such changes and modifications as fall within the true spirit and scope of the invention.

What is claimed is:

1. A bakery icing spreader comprising in combination:
    an elongate generally cylindrical handle having a diameter between about ¾ inch and about 2 inches for ease of grasping by a user thereof and a length shorter than about 20 inches;
    a plurality of tines positioned in spatial relation substantially along the length of said handle and extending generally perpendicularly therefrom in like direction; each of said tines being between about 5 inches and about 10 inches long and having a diameter between about 3/16 inch and about ¾ inch and having a rounded distal end, and
    said bakery icing spread being made of food safe material.

2. The bakery icing spreader as defined in claim 1 wherein said tines are generally cylindrical in shape.

3. The bakery icing spreader as defined in claim 1 wherein said tines are spaced along said handle at center-to-center intervals of about 2 inches.

* * * * *